US008245050B1

(12) United States Patent
Subramanian et al.

(10) Patent No.: US 8,245,050 B1
(45) Date of Patent: Aug. 14, 2012

(54) SYSTEM AND METHOD FOR INITIAL KEY ESTABLISHMENT USING A SPLIT KNOWLEDGE PROTOCOL

(75) Inventors: Ananthan Subramanian, Menlo Park, CA (US); Lawrence Wen-Hao Chang, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 885 days.

(21) Appl. No.: 11/540,440

(22) Filed: Sep. 29, 2006

(51) Int. Cl.
*H04L 29/06* (2006.01)

(52) U.S. Cl. ........ 713/183; 713/182; 713/184; 713/150; 713/151; 713/168; 726/2; 726/3; 726/27; 380/278; 380/281; 380/277

(58) Field of Classification Search ........................ None
See application file for complete search history.

(56) References Cited

U.S. PATENT DOCUMENTS

| 1,310,719 | A | 7/1919 | Vernam |
| 4,262,329 | A | 4/1981 | Bright et al. |
| 4,558,176 | A | 12/1985 | Arnold et al. |
| 4,588,991 | A | 5/1986 | Atalla |
| 4,757,533 | A | 7/1988 | Allen et al. |
| 5,065,429 | A | 11/1991 | Lang |
| 5,150,407 | A | 9/1992 | Chan |
| 5,185,717 | A | 2/1993 | Mori |
| 5,235,641 | A | 8/1993 | Nozawa |
| 5,235,642 | A | 8/1993 | Wobber et al. |
| 5,265,159 | A | 11/1993 | Kung |
| 5,265,164 | A | 11/1993 | Matyas et al. |
| 5,677,952 | A | 10/1997 | Blakley, III et al. |
| 5,687,237 | A | 11/1997 | Naclerio |
| 5,720,034 | A | 2/1998 | Case |
| 5,850,448 | A * | 12/1998 | Ganesan ............. 713/184 |
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 5,991,406 | A | 11/1999 | Lipner et al. |
| 6,073,237 | A | 6/2000 | Ellison |
| 6,134,660 | A | 10/2000 | Boneh et al. |

(Continued)

FOREIGN PATENT DOCUMENTS

WO WO 02/093314 A2 11/2002

(Continued)

OTHER PUBLICATIONS

Baldwin, et al., "Encryption and Key Management in a SAN," Hewlett Packard Laboratories, Bristol, UK, 10 pages, 2002.

(Continued)

*Primary Examiner* — Syed A. Zia
(74) *Attorney, Agent, or Firm* — Cesari and McKenna, LLP

(57) ABSTRACT

A split knowledge protocol adapted to establish an initial key for use in authenticating a first computer to a second computer. The second computer initiates the split knowledge protocol by generating a bit sequence and splitting the sequence into a predetermined number of segments. The second computer then encrypts each segment with a predetermined key associated with each segment before transmitting each encrypted segment to the first computer. In response, the first computer decrypts each encrypted segment using the associated key. The first computer then recovers the bit sequence from the decrypted segments. Accordingly, the first and second computers have knowledge of (i.e., access to) the same bit sequence, which may thus be used as the initial key.

20 Claims, 5 Drawing Sheets

U.S. PATENT DOCUMENTS

| | | | |
|---|---|---|---|
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,600 B1 | 4/2001 | Friedman et al. | |
| 6,249,866 B1 | 6/2001 | Brundrett | |
| 6,272,632 B1 | 8/2001 | Carman et al. | |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,684,222 B1 | 1/2004 | Cornelius et al. | |
| 6,735,693 B1 | 5/2004 | Hamlin | |
| 6,754,827 B1 | 6/2004 | Cane et al. | |
| 6,792,544 B2 | 9/2004 | Hashem | |
| 6,839,437 B1 | 1/2005 | Crane et al. | |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,931,133 B2 | 8/2005 | Andrews et al. | |
| 6,959,394 B1* | 10/2005 | Brickell et al. | 726/5 |
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,139,917 B2* | 11/2006 | Jablon | 713/183 |
| 7,146,505 B1 | 12/2006 | Harada et al. | |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,340,500 B2 | 3/2008 | Traversat et al. | |
| 7,343,623 B2* | 3/2008 | Ross | 726/6 |
| 7,383,436 B2 | 6/2008 | Srivastava et al. | |
| 7,725,730 B2* | 5/2010 | Juels et al. | 713/183 |
| 7,814,203 B2* | 10/2010 | Weatherford | 709/225 |
| 7,913,089 B2* | 3/2011 | Watanabe et al. | 713/182 |
| 8,020,199 B2* | 9/2011 | Smith et al. | 726/7 |
| 8,108,690 B2* | 1/2012 | Kim | 713/193 |
| 8,190,905 B1* | 5/2012 | Chang et al. | 713/180 |
| 2001/0054155 A1 | 12/2001 | Hagan et al. | |
| 2002/0046286 A1 | 4/2002 | Caldwell et al. | |
| 2002/0073324 A1 | 6/2002 | Hsu | |
| 2002/0114453 A1 | 8/2002 | Bartholet et al. | |
| 2003/0021417 A1 | 1/2003 | Vasic et al. | |
| 2003/0028765 A1 | 2/2003 | Cromer et al. | |
| 2004/0030668 A1 | 2/2004 | Pawlowski et al. | |
| 2004/0030932 A1* | 2/2004 | Juels et al. | 713/202 |
| 2004/0107342 A1 | 6/2004 | Pham et al. | |
| 2005/0002531 A1* | 1/2005 | Michaelsen | 380/268 |
| 2006/0129807 A1* | 6/2006 | Halasz et al. | 713/163 |
| 2007/0058801 A1 | 3/2007 | Plotkin | |
| 2007/0079113 A1* | 4/2007 | Kulkarni et al. | 713/150 |
| 2007/0174634 A1 | 7/2007 | Plotkin | |
| 2008/0301791 A1* | 12/2008 | Smith et al. | 726/7 |
| 2009/0089450 A1* | 4/2009 | Weatherford et al. | 709/238 |
| 2009/0089867 A1* | 4/2009 | Weatherford et al. | 726/6 |
| 2011/0321146 A1* | 12/2011 | Vernon et al. | 726/7 |

FOREIGN PATENT DOCUMENTS

WO        WO 02/093314 A3    11/2002

OTHER PUBLICATIONS

Bojinov, et al., Apparatus for Lifetime Key Management, U.S. Appl. No. 11/740,474, filed Apr. 26, 2007, 26 pages.

Bojinov, et al., Encryption Keys for Data Recovery in Storage Security Appliances, U.S. Appl. No. 11/532,025, filed Sep. 14, 2006, 16 pages.

Gandhasri, R., Host Based Rekeying, U.S. Appl. No. 11/772,447, filed Sep. 4, 2007, 25 pages.

Ishii, H., et al., Cluster Key Synchronization, U.S. Appl. No. 11/741,495, filed Apr. 27, 2007, 33 pages.

Ishii, H., et al., Peer to Peer Key Synchronization, U.S. Appl. No. 11/740,490, filed Apr. 26, 2007, 31 pages.

Anderson et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," in Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology-EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email—Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," Linux Journal, Aug. 1, 1997, 8 pages.

Menezes et al., "Handbook of Applied Cryptography," CRC Press, Section 13.7.1, 4 pages, 1997.

Moore, "Preventing Access to a Personal Computer," IBM Technical Disclosure Bulletin, pp. 98-100, Sep. 1992.

Omniva Policy Systems, www.omniva.com (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the A1 EE. pp. 109-115, Feb. 1926.

Weingart, "Physical Security for the μABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Menezes et al., "Handbook of Applied Cryptography," CRC Press, pp. 1-794, 1997.

\* cited by examiner

SYSTEM AND METHOD FOR INITIAL KEY ESTABLISHMENT USING A SPLIT KNOWLEDGE PROTOCOL

FIELD OF THE INVENTION

The present invention relates to security appliances, and more specifically, to securely establishing an initial key for use with a security appliance in a cluster.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is embodied as a computer configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

In certain installations, security appliances may be organized as a security appliance cluster comprising a plurality of security appliance "members" each configured to share common encryption key material for use in load-balancing and/or distributed performance improvements among the members of the cluster. In such cluster configurations, each security appliance maintains a local copy of the encryption key material for the entire cluster. Thus, clients may access any of the security appliances to reach any cryptainers within the cluster to thereby prevent a single security appliance from becoming a bottleneck that increases the latency associated with processing data access requests.

In order to add a security appliance member to the cluster, the member typically must be trusted by at least one of the security appliances that is already a member of the cluster (an "existing cluster member"). One known technique for creating such a trust relationship utilizes a cryptographic certificate associated with each security appliance to establish the appropriate authentication of the appliance. However, a noted disadvantage of this technique involves the needs for a certificate management system, which may become overly complicated and/or burdensome depending upon the number of security appliances in the cluster (and, thus, the number of cryptographic certificates to manage). Furthermore, the inclusion of certificate management modules within the certificate management system may increase the overall complexity and total cost of ownership of a cluster of security appliances.

SUMMARY OF THE INVENTION

The disadvantages of the prior art are overcome by providing a split knowledge protocol adapted to establish an initial key for use in authenticating a first computer to a second computer. Broadly stated, the second computer initiates the split knowledge protocol by generating a bit sequence and splitting the sequence into a predetermined number of segments. The second computer then encrypts each segment with a predetermined key associated with each segment before transmitting each encrypted segment to the first computer. In response, the first computer decrypts each encrypted segment using the associated key. The first computer then recovers the bit sequence from the decrypted segments. Accordingly, the first and second computers have knowledge of (i.e., access to) the same bit sequence, which may thus be used as the initial key.

In the illustrative embodiment, the split knowledge protocol is adapted to securely establish an initial key for use in adding a new security appliance member to a security appliance cluster. Each security appliance member has an associated plurality of recovery officers, wherein each recovery officer is associated with a recovery smart card containing a recovery key. To add a new security appliance member to the cluster, an appropriate quorum of the recovery officers associated with a security appliance already in the cluster (an "existing cluster member") is used to approve the addition of the new member. An administrator may initiate an operation to add the new security appliance member to the cluster by identifying the recovery officers used to approve the addition. The existing cluster member then initiates the split knowledge protocol by generating a random bit sequence and splitting the sequence into a number of segments equal to the number of recovery officers approving the addition. Illustratively, the sequence is split in a manner that enables generation of the original sequence by exclusive ORing each of the split segments together. The existing cluster member then encrypts each segment with a recovery key associated with the recovery card of one of the recovery officers approving the operation. These encrypted values are subsequently forwarded to the new security appliance member.

The segments are decrypted by the recovery officers and sent to the new security appliance over a secure channel. The new security appliance recovers the random sequence upon receiving all of the segments through secure channels. Thereafter, the two members may initiate a mutual secured challenge response protocol to generate a session key as both members now share a secret. Once the session key has been generated, appropriate key material may then be transferred to the new security appliance member over the secure session.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
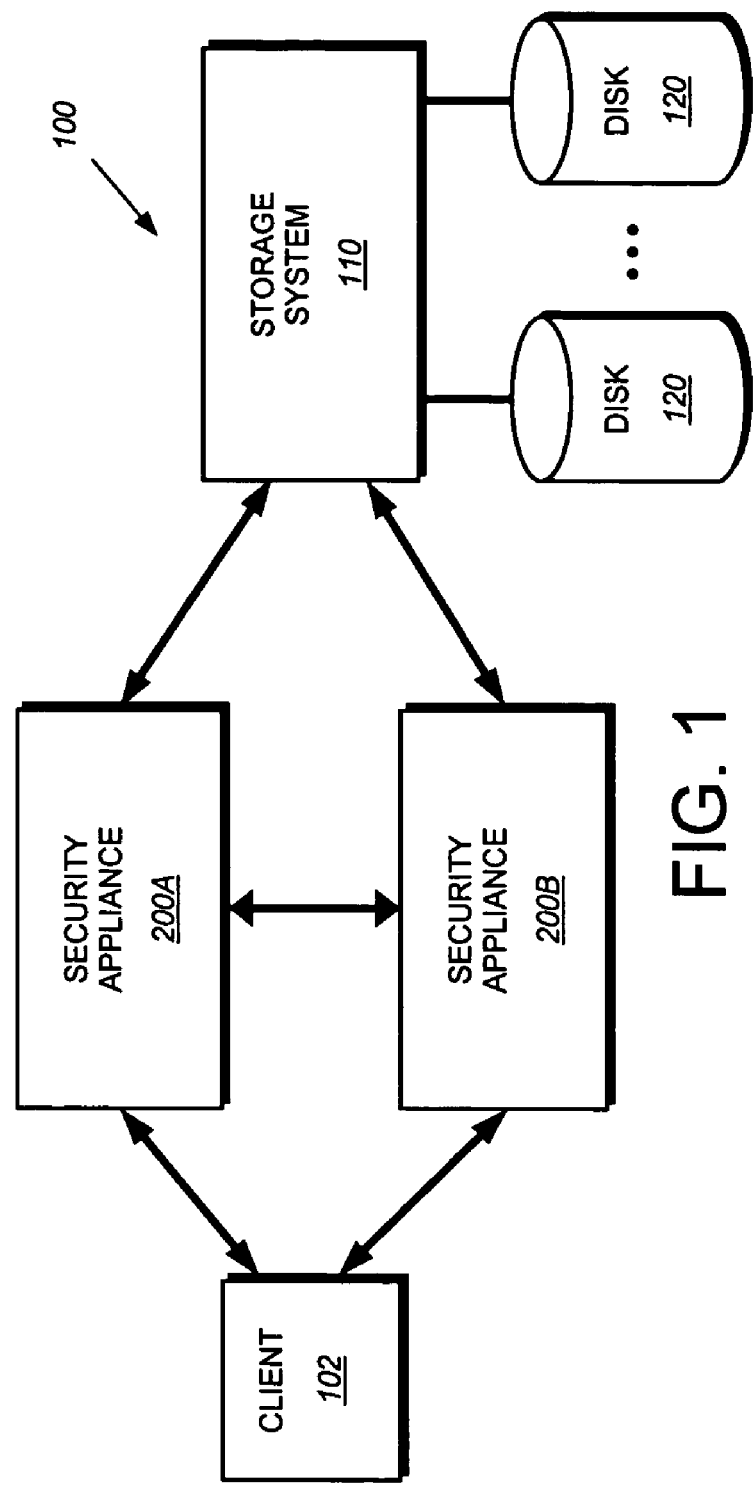
FIG. 1 is a schematic block diagram of an environment including a multi-protocol security appliance cluster that may be advantageously used with the present invention.

FIG. 1 is a schematic block diagram of an environment 100 including a plurality of multi-protocol security appliances 200 A, B that may be advantageously used with the present invention. Each security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a highquality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Illustratively, the security appliances 200A, B may be organized as a cluster to enable load balancing of operations between the security appliances (i.e., "cluster members") or to reduce downtime of the cluster. It should be noted that while two cluster members are shown, the principles of the present invention may be utilized in security appliance clusters having any number of cluster members. As such, a two member cluster should be taken as exemplary only. Security appliances 200 may be arranged in a cluster configuration to, e.g., enable redundancy within the cluster. For example, in the illustrative environment 100, should security appliance 200A suffer a failure condition, client 102 may continue to access the storage system 110 using security appliance 200B. Notably, all of the members of a security appliance cluster may be used interchangeably by clients; to that end, each security appliance 200 shares common cryptographic information material, e.g., encryption keys associated with cryptainers stored on storage system 110.

Figure 2:
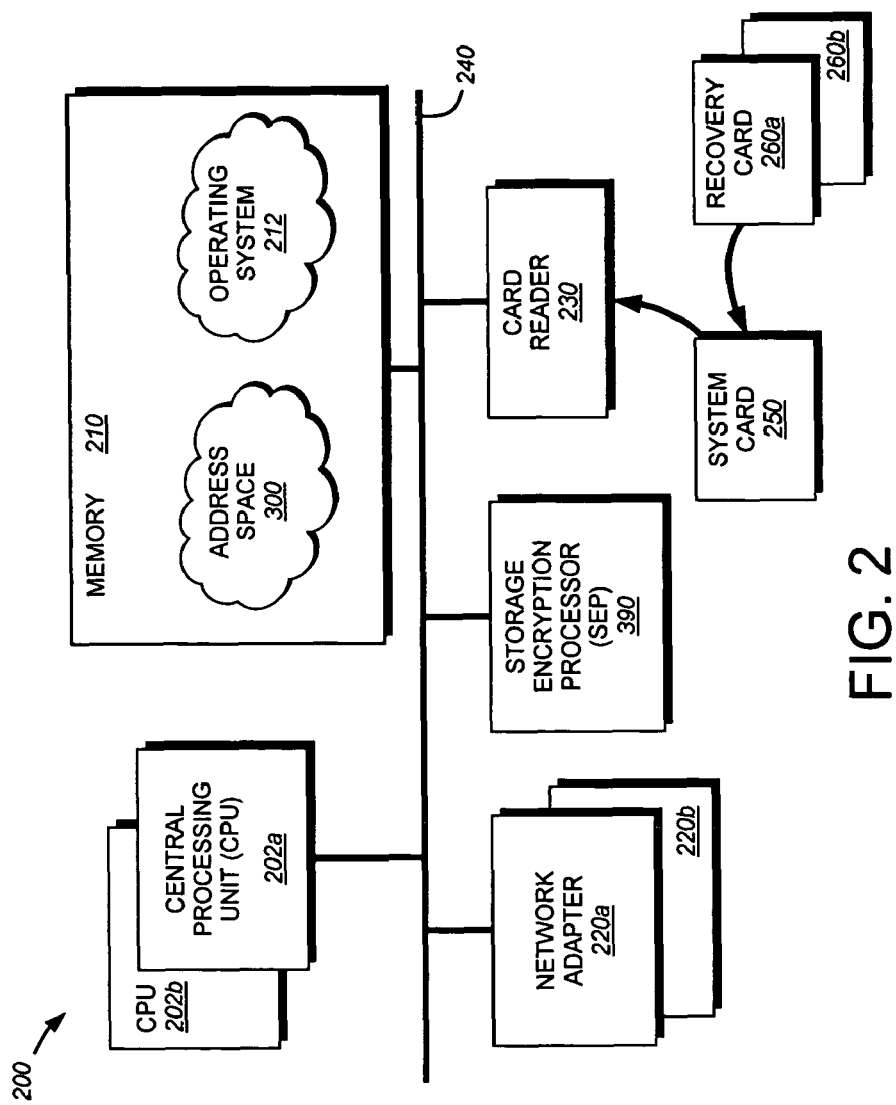
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a storage encryption processor (SEP 390) and a card reader 230 interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

The card reader 230 provides an interface for one or more "smart" recovery cards 260 a, b for use in establishing a key using a split knowledge protocol in accordance with an embodiment of the present invention. Operationally, encryption keys are exchanged between the SEP 390 and system card 250, where they are "secret shared" (cryptographically assigned) to the recovery cards 260 as recovery encryption keys. A quorum setting for the recovery cards 260 may be provided such that the recovery keys stored on the recovery cards are backed up in a threshold scheme whereby, e.g., any 2 of 5 cards are required to perform certain operations. Note that the secret shares are not stored as such on the recovery cards, but rather are encrypted with a key that is assigned to each of the recovery cards. Therefore, the secret shares are "cryptographically assigned" to the recovery cards 260.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network. Furthermore, NICs may be utilized to provide intra-cluster, i.e., security appliance to security appliance, communications.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
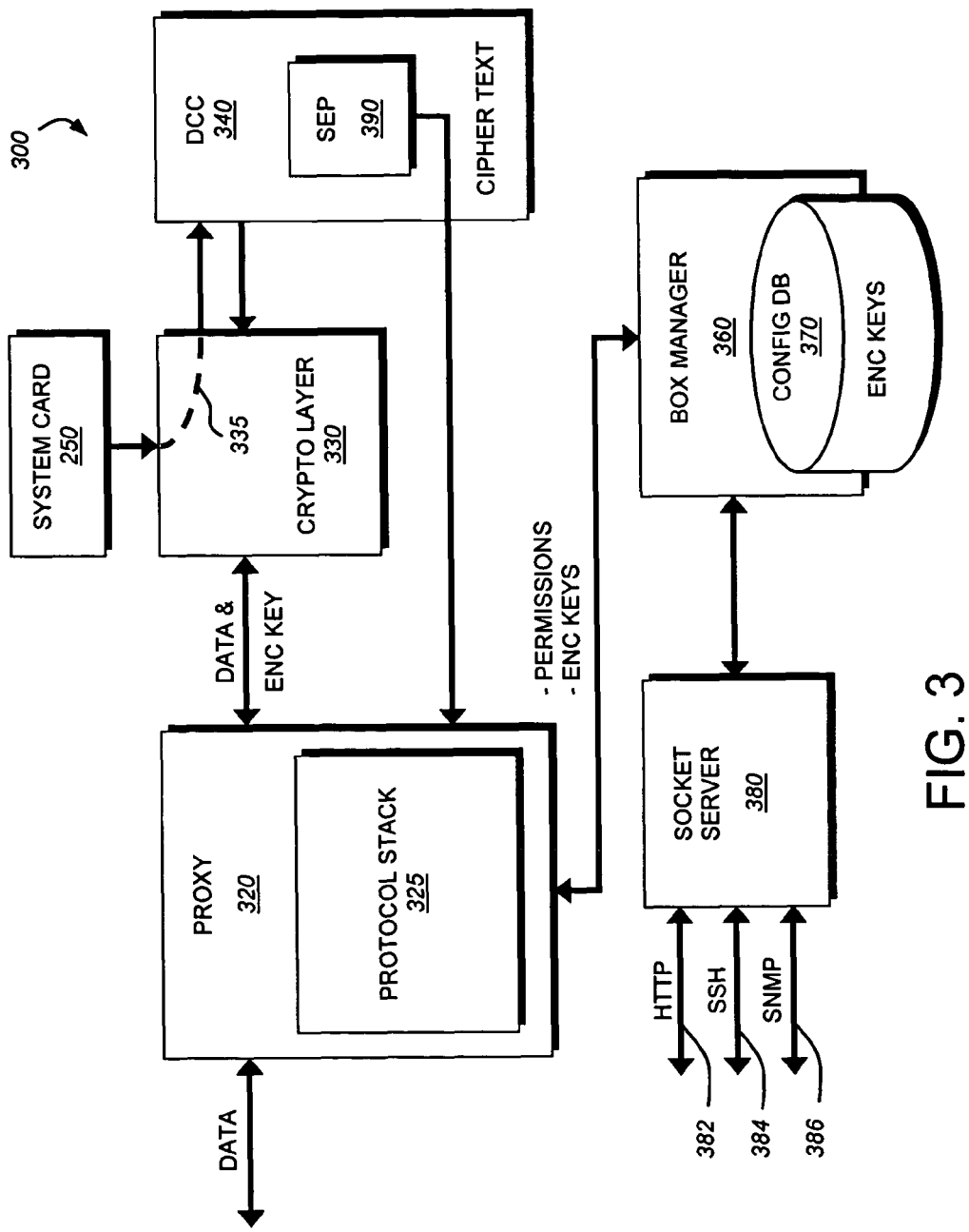
FIG. 3 is a schematic diagram illustrating an arrangement of software processes and modules executing on the security appliance in accordance with an embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., a network protocol stack 325 configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted key. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, (iii) an SNMP interface 386 for remote management and monitoring, and (iv) intra-cluster messages when a security appliance is utilized in a clustered environment.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. Illustratively, SEP 390 resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack 325 of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key is a domain key previously supplied to the SEP via the system card 250.

Figure 4:
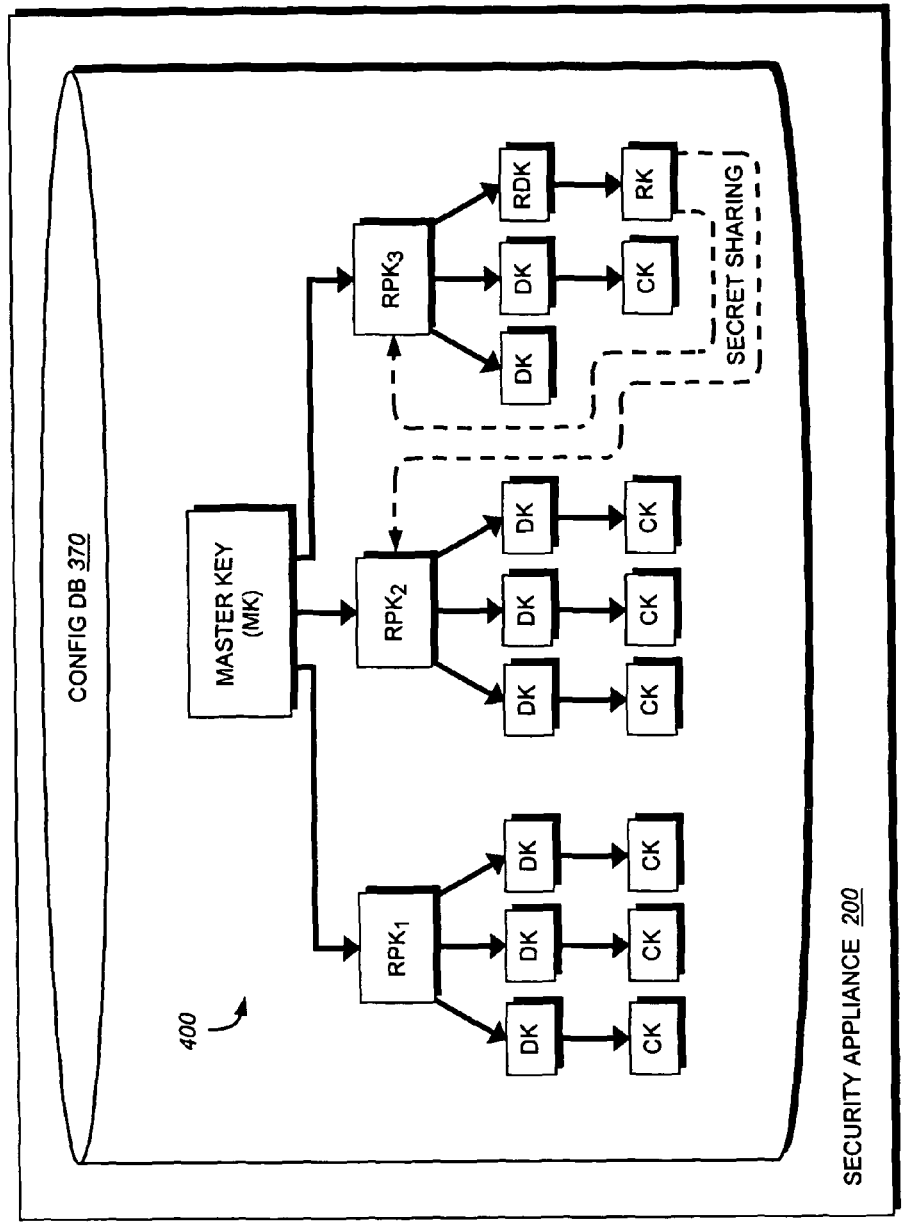
FIG. 4 is a schematic block diagram illustrating a key hierarchy in accordance with an embodiment of the present invention.

FIG. 4 is a schematic block diagram illustrating a key hierarchy 400 in accordance with the present invention. The keys used by security appliance 200 are illustratively created during a boot process. At that time, the key hierarchy 400 is also created, generally in response to user interaction with the security appliance via, e.g., an initialization wizard of the GUI. Notably, there are one or more recovery policy keys (e.g., $RPK_1$, $RPK_2$, $RPK_3$) in the key hierarchy 400. Recovery policy keys may impose limits on retrieval of keys wrapped by them, e.g., keys wrapped by the third recovery policy key $RPK_3$ may be recoverable and may be exported to the software modules, e.g., executing on the security appliance 200.

In the illustrative embodiment, the keys wrapped by each of the recovery policy keys are domain keys DK which, in turn, are used to wrap cryptainer keys CK. These keys are generated by the SEP in response to commands issued by the software modules to generate those keys. Note that each time the SEP generates a key "below" the master key level of the key hierarchy 400, the SEP 390 wraps the generated key with the key directly "above" it in hierarchy and then exports (stores) the wrapped key to the configuration database 370. It should be noted that in an illustrative cluster environment, all keys within the hierarchy beneath, and including, the domain keys are shared by all of the cluster members. The DKs are illustratively transmitted within the cluster using secured trusted channels based on previously agreed pairwise authentication keys. Similarly, in a cluster environment, each security appliance member shares the same set of recovery officers and associated recovery officer keys.

One or more recovery cards 260 are utilized to generate one or more recovery keys. Each recovery key illustratively comprises an ID, a symmetric AES key component and an HMAC signing key component. Each recovery card 260 sends its recovery key RK to the SEP 390. One of the domain keys, i.e., the recovery domain key RDK, is designated (dedicated) for use with storing the recovery key; the SEP wraps each recovery key RK with this dedicated recovery domain key RDK. The SEP 390 uses the stored recovery key RK to encrypt "secret shares".

Illustratively, the SEP uses a threshold scheme to convert the second and third recovery policy keys $RPK_2$, and $RPK_3$ into secret shares SS, with each share assigned to one recovery card 260. To ensure that only the correct card can access its share of the recovery policy keys, the share assigned to each card is further wrapped by the recovery key RK assigned to that card. The wrapped shares are exported by the SEP. In order to recover the second and third recovery policy keys $RPK_2$, and $RPK_3$, each wrapped share is loaded into the appropriate recovery card 260, which then unwraps the share. The unwrapped shares of the threshold, or quorum, may thereafter be combined to reconstitute the recovery policies. Essentially, this enables use of the recovery cards to recover the recovery policy keys. With these keys, all keys below those recovery policy keys in the key hierarchy may be unwrapped from a copy.

As noted, a quorum of recovery cards is needed to recover any keys within the key hierarchy. Similarly, a quorum of recovery cards is required to add a new security appliance member to a security appliance cluster.

The present invention provides a split knowledge protocol adapted to establish an initial key for use in authenticating a first computer to a second computer. Broadly stated, the second computer initiates the split knowledge protocol by generating a bit sequence and splitting the sequence into a predetermined number of segments. The second computer then encrypts each segment with a predetermined key associated with each segment before transmitting each encrypted segment to the first computer. In response, the first computer decrypts each encrypted segment using the associated key. The first computer then recovers the bit sequence from the decrypted segments. Accordingly, the first and second computers have knowledge of (i.e., access to) the same bit sequence, which may thus be used as the initial key.

In the illustrative embodiment, the split knowledge protocol is adapted to securely establish an initial key for use in adding a new security appliance member to a security appliance cluster. Each security appliance member has an associated plurality of recovery officers, wherein each recovery officer is associated with a recovery smart card containing a recovery key. To add a new security appliance member to the cluster, an appropriate quorum of the recovery officers associated with a security appliance already in the cluster (an "existing cluster member") is used to approve the addition of the new member. An administrator may initiate an operation to add the new security appliance member to the cluster by identifying the recovery officers used to approve the addition. The existing cluster member then initiates the split knowledge protocol by generating a bit sequence and splitting the sequence into a number of segments equal to the number of recovery officers approving the addition. Illustratively, the sequence is split in a manner that enables generation of the original sequence by exclusive ORing each of the split segments together, however, alternate techniques for splitting the segments may be utilized. The existing cluster member then encrypts each segment with a recovery key associated with the recovery card of one of the recovery officers approving the operation. These encrypted values are subsequently forwarded to the new security appliance member.

The approving recovery officers then decrypt their respective encrypted segments utilizing the associated recovery keys stored within their recovery cards by, e.g., entering its recovery card into a card reader and entering an appropriate password to utilize the key contained therein. The decrypted segments are supplied securely to the new security appliance member and used to re-create the random sequence. Thereafter, the two members may initiate a mutual secured challenge response protocol to generate a session key as both members now share a secret. Once the session key has been generated, appropriate key material may then be transferred to the new security appliance member over the secure session.

Figure 5:
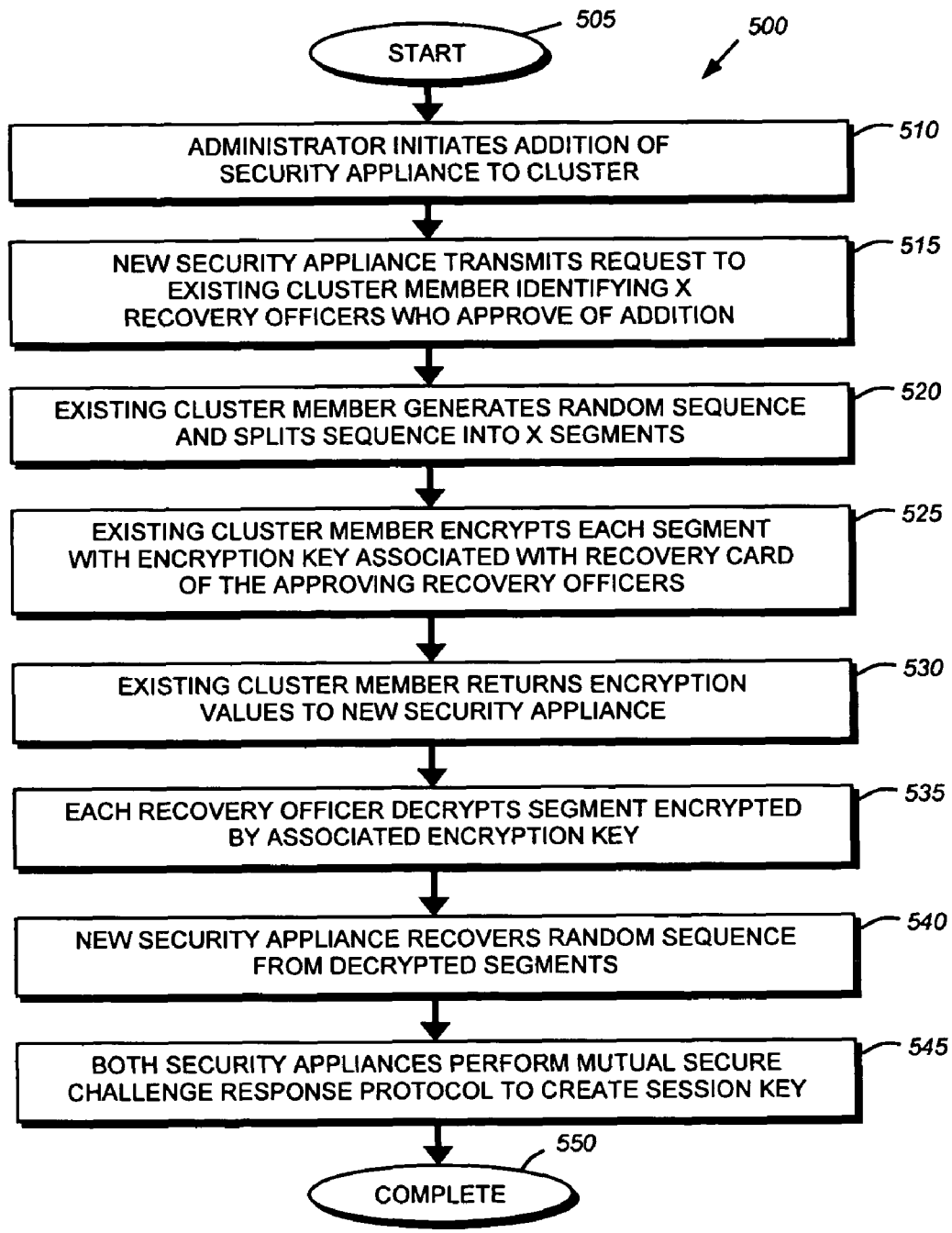
FIG. 5 is a flowchart illustrating the steps of a procedure for establishment of keys in a cluster using a split knowledge protocol in accordance with an embodiment the present invention.

FIG. 5 is a flow chart detailing the steps of a procedure 500 for establishing an initial key using a split knowledge protocol in accordance with an embodiment of the present invention. Illustratively, the generated initial key may be utilized as a shared secret between an existing cluster member and a new security appliance member to generate a session key, which may then be utilized to open a secure session for transmission of other cryptographic material between the existing cluster members and the new security appliance members. The procedure 500 begins in step 505 and continues to step 510 where an administrator initiates the addition of a new security appliance member to a security appliance cluster using, e.g., a user interface to the box manager of the new security appliance. It should be noted that the cluster may comprise one or more security appliances. That is, the teachings of the present invention may be utilized to initially create a two member cluster by adding a new security appliance to a single existing security appliance or may be utilized to add a new security appliance to a cluster of any size.

Specifically, the administrator initiates the addition of the new security appliance by, e.g., invoking a CLI and/or GUI command to add the new security appliance as a member of the cluster. The administrator also identifies the recovery officers used to approve the addition of the new security appliance member to the cluster. The recovery officers are illustratively recovery officers associated with an existing cluster member. As noted above, the recovery keys may be split and cryptographically assigned to recovery cards. Furthermore, such key splitting may be associated with an appropriate quorum level, e.g., a requirement that 2 of the 5 keys are used to perform an operation. In accordance with an illustrative embodiment of the present invention, a quorum of the recovery officers of the existing cluster member is required to approve the addition of the new security appliance member to the cluster.

The new security appliance member then transmits a request to the existing cluster member identifying the number (X) of recovery officers used to approve the addition in step 515. In the illustrative embodiment, X is equal to or greater than the necessary quorum associated with the recovery cards 260. In response to receiving the request, the existing cluster member generates a random bit sequence and splits the sequence into X segments in step 520. Illustratively, each of the X segments may be exclusive ORed together to generate the overall random sequence. Thus, for example, if X=3, then the sequence S may be split into segments $S_1$, $S_2$ and $S_3$ such that $S_1 \oplus S_2 \oplus S_3 = S$. However, it should be noted that in alternate embodiments, other key splitting techniques may be utilized. As such, the above description should be taken as exemplary only.

In step 525 the existing security appliance member encrypts each of the segments with the recovery encryption key associated with one of the recovery cards of the approving recovery officers. That is, each of the segments is encrypted with a different encryption key associated with one of the approving recovery officers. The existing cluster member then returns the encrypted values to the new security appliances in step 530. Using the new security appliance member, each recovery officer decrypts the segment that was encrypted with its associated encryption key in step 535. This may be accomplished by, e.g., each recovery officer, in turn, inserting its recovery card into the card reader on the new security appliance and entering a password associated with the recovery card. The box manager 360 on the new security appliance then decrypts the encrypted segment using the recovery encryption key stored on the recovery card.

The security appliance may then recover the random sequence from the decrypted segments by exclusive ORing them together. It should be noted that any deterministic set of operations may be utilized to recover the original bit sequence from the decrypted segments. As such, the use of exclusive-OR operations should be taken as exemplary only. At this point, the new security appliance and existing cluster members have copies of the random sequence. Therefore, both as both members may cooperate to perform a mutual secured challenge response protocol to create the necessary session key in step 545. Once the session key has been created, encryption key material, such as key encryption keys, etc., may be transferred via the secure session. The procedure then completes in step 550.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for establishing an initial key for use in authenticating a new computer to an existing computer operatively connected in a cluster, comprising:
   generating a bit sequence on the existing computer;
   splitting the bit sequence into a predetermined number of segments at the existing computer;
   encrypting one or more of the segments with an associated key at the existing computer, wherein encrypting the one or more segments comprises encrypting at least one of the one or more segments with a second associated key that is different than the associated key;
   transmitting the encrypted segments to the new computer;
   decrypting the encrypted segments using the associated key at the new computer; and
   recovering the bit sequence from the decrypted segments to establish the initial key.

2. The method of claim 1 further comprising associating the associated key with a recovery card of the cluster.

3. The method of claim 2 further comprising associating the recovery card with a recovery officer of the existing computer.

4. The method of claim 1 wherein at least one of the new and existing computers comprises a security appliance.

5. The method of claim 1 further comprising generating a secure session between the new and existing computers using the initial key as a shared secret.

6. The method of claim 1 wherein the associated key is generated from a recovery domain key.

7. The method of claim 2 wherein the predetermined number of segments equals a quorum associated with the recovery card of a plurality of recovery cards of the cluster.

8. The method of claim 1 further comprising transmitting a request to approve an operation from the new computer to the existing computer.

9. The method of claim 8 wherein the request comprises an identification of a number of recovery officers of the existing computer required to approve the operation.

10. The method of claim 9 wherein the predetermined number of segments equal the number of recovery officers approving the operation.

11. The method of claim 8 wherein the operation comprises associating the new computer with the existing computer in the cluster.

12. The method of claim 1 wherein recovering the bit sequence comprises exclusive ORing each of the predetermined number of segments together.

13. A system configured to establish an initial key in a clustered environment, comprising:
   a second computer configured to operatively connect with a first computer in the clustered environment;
   the first computer configured to receive a request from the second computer, and in response, generate a bit sequence, split the bit sequence into a predetermined number of segments, encrypt one or more of the segments with a recovery key associated with at least one recovery card of a plurality of recovery cards of the clustered environment, and transmit the encrypted segments to the first computer, wherein the first computer is further configured to encrypt at least one of the one or more segments with a second associated key that is different than the associated key; and
   the second computer further configured to decrypt the encrypted segments using the recovery key and further configured to recover the bit sequence from the decrypted segments.

14. The system of claim 13 wherein at least one of the first and second computers comprises a security appliance.

15. The system of claim 13 wherein the request comprises an identification of a number of recovery officers of the first computer required to approve an operation.

16. The system of claim 15 wherein the predetermined number of segments equal the number of recovery officers required to approve the operation.

17. The system of claim 16 wherein the operation comprises associating the second computer with the first computer in the clustered environment.

18. The system of claim 13 wherein the second computer is configured to recover the bit sequence by exclusive ORing of the segments together.

19. The system of claim 13 wherein the first and second computers are further configured to generate a secure session between the first and second computers using the initial key as a shared secret.

20. The system of claim 13 wherein the second computer is further configured to receive the at least one recovery card to decrypt the encrypted segments.

* * * * *

UNITED STATES PATENT AND TRADEMARK OFFICE
CERTIFICATE OF CORRECTION

PATENT NO.        : 8,245,050 B1                                Page 1 of 1
APPLICATION NO.   : 11/540440
DATED             : August 14, 2012
INVENTOR(S)       : Ananthan Subramanian et al.

It is certified that error appears in the above-identified patent and that said Letters Patent is hereby corrected as shown below:

In the Specification

In col. 10, line 2 should read:
OR operations should be taken as ~~exemplaty~~ exemplary only. At this Signed and Sealed this
Twenty-fifth Day of June, 2013

Teresa Stanek Rea
*Acting Director of the United States Patent and Trademark Office*